April 26, 1955     D. M. MORGENSTERN     2,706,931
REAR VIEW MIRROR CONSTRUCTION
Filed May 4, 1954

INVENTOR.
DAVID M. MORGENSTERN
BY
Brennan B. West
ATTORNEY

United States Patent Office 2,706,931
Patented Apr. 26, 1955

2,706,931

REAR VIEW MIRROR CONSTRUCTION

David M. Morgenstern, Euclid, Ohio, assignor to Nelmor Manufacturing Corporation, Cleveland, Ohio, a corporation of Ohio Application May 4, 1954, Serial No. 427,596

8 Claims. (Cl. 88—98)

This invention relates to rear view mirrors, and more particularly to an improvement which has to do with the mounting of the glass mirror in the casing of the mirror head.

An object of the invention is to provide a simple, serviceable and relatively inexpensive mirror head construction of a character that will cheapen and expedite assembly; that will provide a mounting for the glass mirror of sufficient resiliency to reduce the likelihood of chipping or breakage, especially during assembly of the parts which involves forming or peening the peripheral portion of the mirror head casing about the edge of the glass mirror, and that will effectively seal the casing against the ingress of water or moisture thereby to preserve the coating of reflective material usual on the rear sides of glass mirrors.

The foregoing objects, with others that will appear as this description proceeds, are attained in the embodiment of the invention illustrated in the accompanying drawing wherein.

Figure 3:
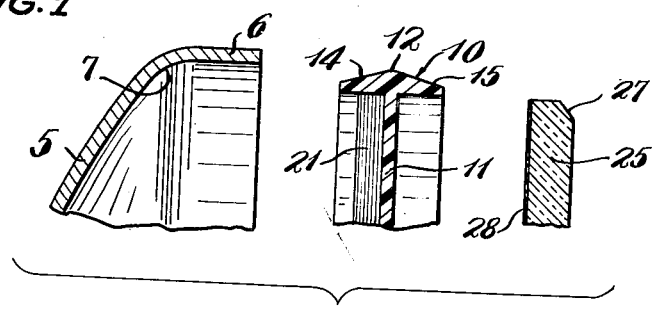
Figure 4:
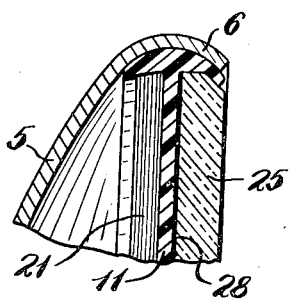

Fig. 3 includes enlarged fragmentary sectional details of the casing of the mirror head before its peripheral portion is formed or peened inwardly; the plastic mounting member in its original or relaxed condition, and the glass mirror, prior to the assembly of these parts, and Fig. 4 is a similar view of the parts shown in Fig. 3 in assembled condition.

In the following detailed description of the invention and throughout the views of the drawing, like reference numerals designate like parts.

Figures 1, 2:
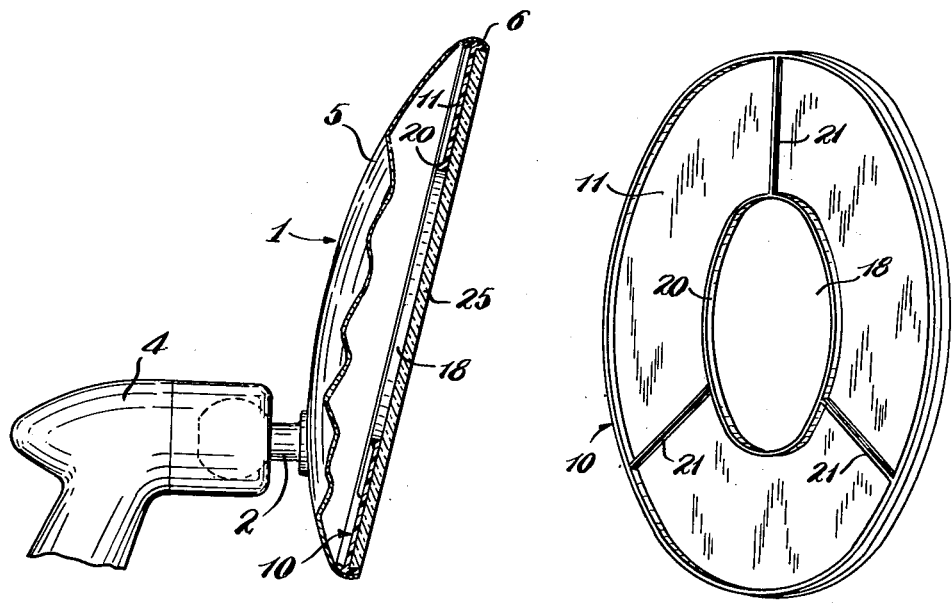
Fig. 1 is a side elevational view, partly in section, of a rear view mirror structure incorporating my improvements.
Fig. 2 is a perspective view of the plastic mounting member that receives and supports the mirror.

The structure shown in Fig. 1 includes a mirror head designated, generally, by the reference numeral 1. The head is adjustably connected in a conventional manner through the medium of an element 2 to a supporting bracket 4.

5 designates the casing of the mirror head which is desirably made of sheet metal. It is shown as a shallow circular shell having an open side surrounded by a peripheral flange 6, the latter being illustrated in Fig. 3 in its original condition. The casing, however, may be made of any desired depth or configuration so long as an internal shoulder 7 is provided between the body portion of the casing and the peripheral flange 6 thereof.

10 denotes, generally, a frame-like plastic mounting member, shown in the present instance as being in the form of an annulus. The member includes a flat web 11, a rim 12 that surrounds the web and extends on both sides of the plane thereof in the form of an inner flange 14 and an outer flange 15. The relatively large opening 18 of the mounting member is surrounded, on the inner side of the web, by a bead 20, and shown as extending outwardly or radiating from the bead 20 are ribs 21 that join the inner flange 14 and impart stability to the web 11. The depth of the ribs 21 is desirably less than that of the flange 14, as best appears from Figs. 3 and 4, and the bead 20 is preferably of about the same depth as the ribs. The glass mirror is designated 25 and the outer surface joins the edge of the mirror through a chamfered portion or bevel 27. Applied to the inner side of the mirror is the usual coating of reflective material indicated at 28 in Figs. 3 and 4.

The mounting member 10 is made of a semi-rigid plastic, and said member is stiffened by the rim 12, the bead 20, and the ribs 21. The entire outer face of the web 11 is perfectly plain. In the assembly of the head, the member 10 is pressed into the peripheral flange 6 of the shell 5 until the inner flange 14 of the mounting member tightly engages and conforms to the shape of the shoulder 7. The glass mirror 25 is disposed inwardly against the web 11 and within the confines of the outer flange 15, the side of the mirror having the coating 28 being in contact with the web 11 throughout the area of the latter. With the glass mirror so positioned within and protected by the mounting member, the flange 6 of the casing is formed or peened inwardly by suitable means in a gentle curve outwardly of the shoulder 7, as best shown in Fig. 4 and, as will be seen from this view, the outer edge of the flange 6, in its final position, presses the underlying portion of the flange 15 of the mounting member tightly against the edge and bevel 27 of the mirror 25, thereby to securely, but slightly yieldingly, hold the mirror within the casing. During this operation, the web 11 of the mounting member resiliently sustains the mirror so that the latter may yield in a direction axially of the casing and thus be relieved of strains that would otherwise be imposed upon it.

It is evident from the construction described that the joints between the flange 15 and the edge portion of the mirror, and between the rim 12 and the surrounding portion of the casing, are tightly sealed against the ingress of water or moisture which, if permitted to enter, would cause deterioration of the coating 28. Also, the resiliency of the semi-rigid plastic mounting member reduces the likelihood of the mirror being broken or chipped during the assembly of the parts and while the device is in use. It is further evident from the foregoing that the invention provides a very durable construction, and one that is simple and relatively inexpensive to manufacture.

Having thus described my invention, what I claim is:

1. In a rear view mirror construction, a semi-rigid plastic mounting member including a substantially flat web, and a rim integral with and surrounding the web and extending in opposite directions from the plane thereof to provide inner and outer flanges, the web having a relatively large opening spaced a substantial distance inwardly from the rim, a glass mirror engaged with the outer side of the web and fitting within said outer flange and having a substantially cylindrical edge portion of lesser depth than said outer flange, and a casing having an open side surrounded by a peripheral flange and provided with an internal shoulder between said peripheral flange and the body portion of the casing, the mounting member tightly fitting within said peripheral flange with the inner flange of the mounting member deformed by and in complementary relation to said shoulder, the peripheral flange of the casing, outwardly from said shoulder, converging so as to clamp the mirror in place with the outer flange of the mounting member compressed between the aforesaid cylindrical edge portion of the mirror and said peripheral flange and deformed substantially radially inwardly about the mirror forwardly of said edge portion.

2. The combination and arrangement of parts defined by claim 1, wherein said web has a bead projecting from its inner side adjacent to and about said opening.

3. The combination and arrangement of parts defined by claim 1, wherein the web has, on its inner side, ribs extending from the inner flange of the mounting member to the region of the opening in the web.

4. The combination and arrangement of parts defined by claim 1, wherein said web has a bead projecting from its inner side adjacent to and about said opening, and ribs extending from said bead to the inner flange of the mounting member.

5. In a rear view mirror construction, an annular semi-rigid plastic mounting member including a web that encircles the central opening of the annular member, and a rim that surrounds the web and provides inner and outer flanges, a circular glass mirror engaged with the outer side of the web and fitting within the outer flange of the mounting member, the mirror having a bevel between its front face and edge, a casing in the form of a circular shell having an open side surrounded by a peripheral flange that joins the body portion of the casing through a curved part that provides an internal shoulder between said body portion and the peripheral flange, the mounting member occupying the open side of the casing with the inner flange of the former compressed against, and conforming with the contour of, said shoulder, the peripheral flange of the casing, outwardly of said shoulder, being curved inwardly and compressing the outer flange of the mounting member tightly about the edge of the mirror and over and in engagement with said bevel.

6. In a rear view mirror construction, the combination and arrangement of parts defined by claim 5, wherein the web of the mounting member is provided with an annular bead on its inner side that surrounds the central opening of said member.

7. In a rear view mirror construction, the combination and arrangement of parts defined by claim 5, wherein the web of the mounting member is provided with ribs on its inner side that extend substantially radially from the region of the central opening of the mounting member to the said inner flange thereof.

8. In a rear view mirror construction, the combination and arrangement of parts defined by claim 5, wherein the web of the mounting member is provided on its inner side with ribs that extend substantially radially from said annular bead to the inner flange of said member, said inner flange being of greater depth than said ribs.

References Cited in the file of this patent

UNITED STATES PATENTS

| | | |
|---|---|---|
| 2,089,463 | Ritz-Woller | Aug. 10, 1937 |
| 2,202,697 | La Hodny | May 28, 1940 |
| 2,307,568 | Colbert | Jan. 5, 1943 |
| 2,466,625 | Ulmer | Apr. 5, 1949 |
| 2,498,065 | Budreck | Feb. 21, 1950 |
| 2,500,897 | Friedman | Mar. 14, 1950 |
| 2,585,399 | Mead | Feb. 12, 1952 |